United States Patent
Vidyadhara et al.

(10) Patent No.: US 10,705,852 B2
(45) Date of Patent: Jul. 7, 2020

(54) SYSTEM AND METHOD OF PROVIDING UPDATES

(71) Applicant: Dell Products L.P., Round Rock, TX (US)

(72) Inventors: Sumanth Vidyadhara, Bangalore (IN); Vivekanandh Narayanasamy Rajagopalan, Bangalore (IN); Raveendra Babu Madala, Bangalore (IN); Srikanth Kondapi, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/896,545

(22) Filed: Feb. 14, 2018

(65) Prior Publication Data
US 2019/0250928 A1    Aug. 15, 2019

(51) Int. Cl.
| | | |
|---|---|---|
| *G06F 13/24* | (2006.01) | |
| *G06F 9/4401* | (2018.01) | |
| *G06F 21/57* | (2013.01) | |
| *G06F 8/65* | (2018.01) | |
| *G06F 9/48* | (2006.01) | |
| *G06F 13/10* | (2006.01) | |

(52) U.S. Cl.
CPC .............. *G06F 9/4411* (2013.01); *G06F 8/65* (2013.01); *G06F 9/48* (2013.01); *G06F 13/102* (2013.01); *G06F 13/24* (2013.01); *G06F 21/572* (2013.01)

(58) Field of Classification Search
None
See application file for complete search history.

(56) References Cited

U.S. PATENT DOCUMENTS

| | | | | |
|---|---|---|---|---|
| 6,189,050 B1 * | 2/2001 | Sakarda | ................ | G06F 9/4411 709/220 |
| 6,804,740 B1 * | 10/2004 | Watts, Jr. | ................ | G06F 1/263 361/679.41 |
| 2001/0020268 A1 * | 9/2001 | Kawano | ................ | G06F 1/1632 713/2 |

(Continued)

OTHER PUBLICATIONS

Unified EFI Forum, Inc., "Unified Extensible Firmware Interface Specification," Version 2.7, May 2017; 2899 pages.

(Continued)

*Primary Examiner* — Shih-Wei Kraft
(74) *Attorney, Agent, or Firm* — Baker Botts L.L.P.

(57) ABSTRACT

In one or more embodiments, one or more systems, methods, and/or processes may receive an interrupt from a device associated with an information handling system; may retrieve an executable from the device; may store the executable via a memory medium of the information handling system; may provide a signal, to an operating system executing via at least one processor of the information handling system, that indicates that the executable was stored via the memory medium; may execute the executable via the at least one processor; may retrieve one or more of a device driver for the device and firmware for the device; and may install the one or more of the device driver for the device and the firmware for the device. In one or more embodiments, the device may include a docking station or a peripheral device, among others.

11 Claims, 7 Drawing Sheets

(56) References Cited

U.S. PATENT DOCUMENTS

| | | | | |
|---|---|---|---|---|
| 2002/0103997 A1* | 8/2002 | Merkin | ............... | G06F 9/4406 |
| | | | | 713/100 |
| 2004/0243534 A1* | 12/2004 | Culter | ................. | G06F 9/4411 |
| 2005/0138256 A1* | 6/2005 | Bolay | .................. | G06F 9/4812 |
| | | | | 710/260 |
| 2009/0278679 A1* | 11/2009 | Dailey | .................. | G06F 9/542 |
| | | | | 340/500 |
| 2014/0007073 A1* | 1/2014 | Cavalaris | ............... | G06F 8/654 |
| | | | | 717/172 |
| 2014/0359593 A1* | 12/2014 | Cohen | ..................... | G06F 8/65 |
| | | | | 717/169 |
| 2015/0277895 A1* | 10/2015 | Samuel | ................ | G06F 9/4411 |
| | | | | 713/1 |
| 2016/0306617 A1* | 10/2016 | Riedisser | .................. | G06F 8/65 |
| 2016/0378576 A1* | 12/2016 | Jayakumar | ............. | G06F 9/544 |
| | | | | 719/312 |

OTHER PUBLICATIONS

Unified EFI Forum, Inc., "Advanced Configuration and Power Interface Specification," Version 6.2, May 2017; 1192 pages.
Microsoft, "Windows UEFI Firmware Update Platform," Retrieved from url: https://docs.microsoft.com/en-us/windows-hardware/drivers/bringup/windows-uefi-firmware-update-platform, Apr. 4, 3013; 46 pages.

\* cited by examiner

SYSTEM AND METHOD OF PROVIDING UPDATES

BACKGROUND

Field of the Disclosure

This disclosure relates generally to information handling systems and more particularly to updating devices associated with information handling systems and information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, methods, and/or processes may receive an interrupt from a device associated with an information handling system; may retrieve an executable from the device; store the executable via a memory medium of the information handling system; may provide a signal, to an operating system executing via at least one processor of the information handling system, that indicates that the executable was stored via the memory medium; execute the executable via the at least one processor; may retrieve one or more of a device driver for the device and firmware for the device; and may install the one or more of the device driver for the device and the firmware for the device. In one or more embodiments, the device may include a docking station or a peripheral device, among others. In one or more embodiments, installing the one or more of the device driver for the device and the firmware for the device may include installing the device driver, and after installing the device driver, the operating system may communicate with the device via the device driver. In one or more embodiments, the operating system may receive the signal via at least one of a Windows Management Interface (WMI) and a Common Information Model (CIM). For example, the interrupt may be an Advanced Configuration and Power Interface (ACPI) interrupt. In one or more embodiments, retrieving the one or more of the device driver for the device and the firmware for the device may include retrieving the one or more of the device driver for the device and the firmware for the device from the device or via a network.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a reference numeral followed by a letter refers to a specific instance of an element and the numeral only form of the reference numeral refers to the collective element. Thus, for example, device '12A' refers to an instance of a device class, which may be referred to collectively as devices '12' and any one of which may be referred to generically as a device '12'.

In one or more embodiments, a device (e.g., a peripheral, an internal device, a docking station, etc.) without a device driver (e.g., an operating system device driver, a pre-boot device driver, etc.) may not be recognized, may not be automatically detected, or may not exist on an information handling system. For example, the device may not be utilized by an operating system (OS) or during a pre-OS boot sequence. In one or more embodiments, one or more systems, methods, and/or processes described herein may automatically detecting a device associated with an information handling system (IHS). In one or more embodiments, one or more of firmware for the device and a device driver for the device, among others, may be obtained and installed. In one example, a device driver for the device may not be stored by the IHS, and one or more systems, methods, and/or processes described herein may permit and/or enable the IHS to utilize the device regardless of whether or not the IHS stores the device driver. In another example, this may reduce a number of restarts of an IHS. In one instance, reducing a number of restarts may better a user's experience with the IHS. In a second instance, reducing a number of restarts may reduce wear and tear of the IHS. In another instance, reducing a number of restarts may reduce energy consumption of the IHS.

In one or more embodiments, an event may be generated in response to detecting a device associated with the IHS. For example, a firmware module of the IHS may receive the event, and based on information associated with the event, the firmware of the IHS may invoke a process that may automatically obtain one or more of firmware for the device and a device driver for the device, among others. In one instance, the one or more of the firmware for the device and the device driver for the device may be obtained via a storage device of the IHS. In a second instance, the one or more of the firmware for the device and the device driver for the device may be obtained via a network (e.g., may be retrieved and/or received via a network). In another instance, the one or more of the firmware for the device and the device driver for the device may be obtained via the device (e.g., the device may store the one or more of the firmware for the device and the device driver for the device, among others).

In one or more embodiments, a device may store one or more of a device driver, an executable, firmware name information, firmware identification information, and firmware version information, among others, via storage of the device. In one example, the one or more of the device driver, the executable, and the firmware version information may be stored via an extended Peripheral Component Interconnect Express (PCIe) configuration memory. In another example, the one or more of the device driver, the executable, and the firmware version information may be stored via one or more memory media. In one or more embodiments, information associated with the device may be stored via an Unified Extensible Firmware Interface (UEFI) Extensible Firmware Interface (EFI) System Resource Table of an IHS. For example, the information associated with the device may be provided to an OS of the IHS after the information associated with the device is stored via the UEFI EFI System Resource Table (ESRT) of the IHS. For instance, the OS may be signaled after the information associated with the device is stored via the UEFI ESRT.

In one or more embodiments, firmware associated with the device and/or a device driver information associated with the device may be stored via the ESRT. In one example, after the firmware associated with the device and/or the device driver information associated with the device are stored via the ESRT, the firmware associated with the device may be queried via an Advanced Configuration and Power Interface (ACPI) source language code (e.g., executable by a processor of the IHS). For instance, the firmware associated with the device may be queried during a boot sequence or a pre-boot sequence. In another example, after the firmware associated with the device and/or the device driver information associated with the device are stored via the ESRT, the firmware associated with the device and/or the device driver may be queried by an OS. For instance, the firmware associated with the device and/or the device driver may be queried in an OS-context.

In one or more embodiments, the firmware associated with the device and/or the device driver information associated with the device may be dynamically stored via the ESRT. For example, the ESRT may already store information that is available via one or more of an ACPI source language (ASL) code and/or an OS-context, and the firmware associated with the device and/or the device driver information associated with the device may be stored via the ESRT after the ESRT stores information that is available via one or more of the ASL code and/or the OS-context. In one or more embodiments, the device driver may be an ACPI device driver and/or an OS device driver. In one example, the device driver may be utilized before the OS boots. For instance, firmware of the IHS may utilize the device driver in communicating with the device. In another example, the device driver may be utilized by an OS to communicate with the device.

In one or more embodiments, the IHS may receive an interrupt from the device. For example, the interrupt may be or include an ACPI interrupt. In one or more embodiments, the IHS may query the device for information associated with the device. For example, the information associated with the device may include one or more of a device driver, an executable, firmware name information, firmware identification information, and firmware version information, among others. In one or more embodiments, ASL code (e.g., executable by a processor of the IHS) may read the device for information associated with the device (e.g., the device driver, the executable, the firmware name information, the firmware identification information, the firmware version information, etc.). In one or more embodiments, the information associated with the device may be stored via a resource data structure. In one example, the data structure may be or include a table. In one instance, the table may be or include a resource table. In another instance, the table may be or include an ESRT. In another example, the data structure may be local to the IHS. In one instance, the data structure may not be a part of an OS. In another instance, the data structure may be or include a custom data structure.

Figure 1:
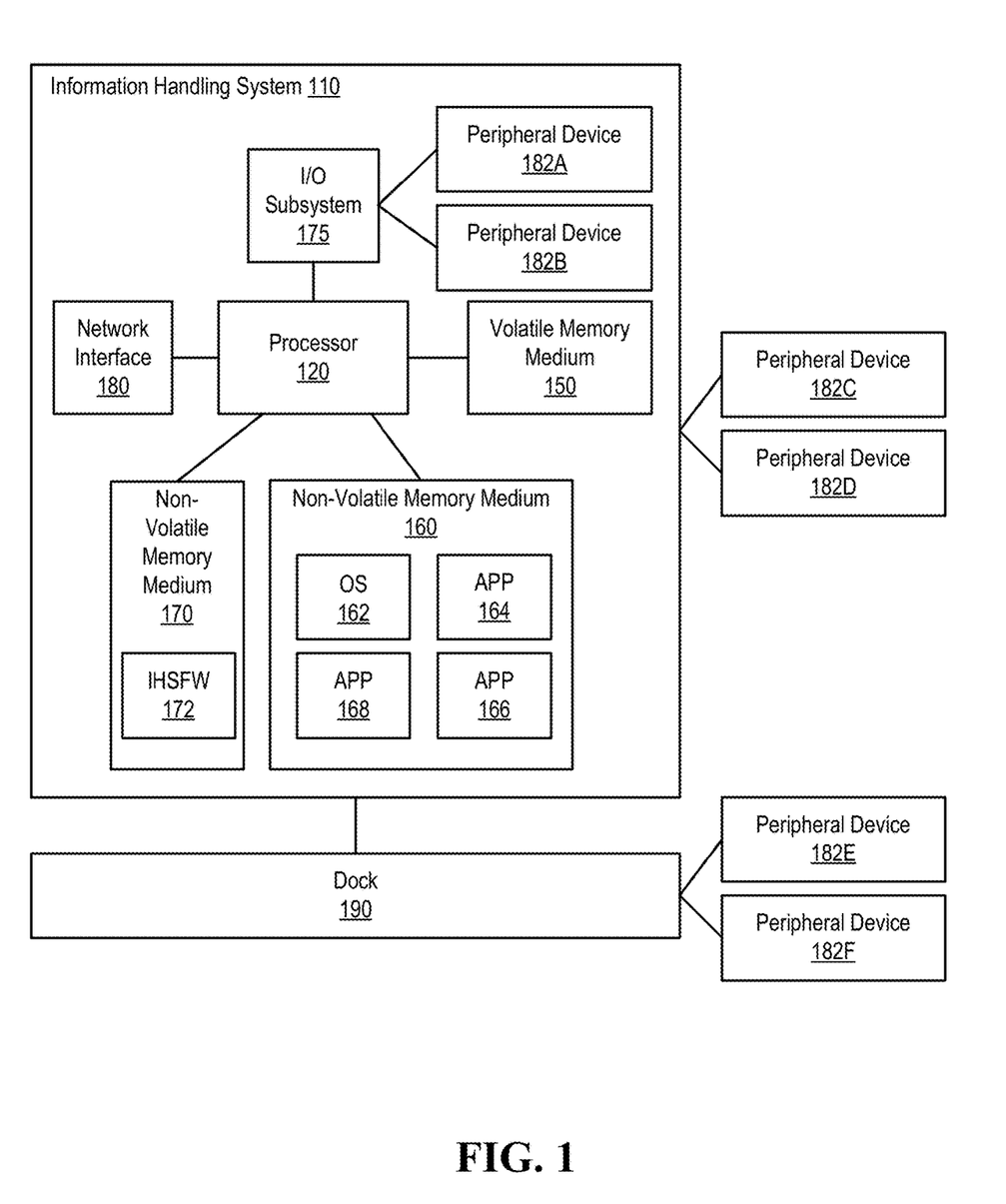
FIG. 1 illustrates an example of an information handling system, according to one or more embodiments.

Turning now to FIG. 1, an exemplary information handling system is illustrated, according to one or more embodiments. An IHS 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, and a network interface 180. As illustrated, volatile memory medium 150, non-volatile memory media 160 and 170, I/O subsystem 175, and network interface 180 may be communicatively coupled to processor 120.

In one or more embodiments, one or more of volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCIe root complexes. In another example, one or more of an I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, flowcharts, methods, and/or processes described herein. In one example, processor 120 may execute processor instructions from one or more of memory media 150-170 in implementing one or more systems, flowcharts, methods, and/or processes described herein. In another example, processor 120 may execute processor instructions via network interface 180 in implementing one or more systems, flowcharts, methods, and/or processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or functionalities of one or more of a basic input/output system (BIOS), an EFI, an UEFI, and an ACPI, among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). For example, the SoC may include processor 120 and a platform controller hub (not specifically illustrated).

In one or more embodiments, IHS 110 may include one or more peripheral devices. For example, IHS 110 may include peripheral devices 182A and 182B, as shown. In one or more embodiments, IHS 110 may be coupled to one or more peripheral devices. For example, IHS 110 may be coupled to peripheral devices 182C and 182D, as illustrated. In one or more embodiments, IHS 110 may be coupled to a dock. For example, IHS 110 may be coupled to a dock 190, as shown. In one instance, IHS 110 and dock 190 may be coupled in a wireless fashion. In another instance, IHS 110 may be coupled to dock 190 in a wired fashion. In one or more embodiments, dock 190 may be coupled to one or more peripheral devices. For example, 190 may be coupled to peripheral devices 182E and 182F. In one or more embodiments, IHS 110 may be coupled to one or more of peripheral devices 182E and 182F via dock 190. In one or more embodiments, dock 190 may be or include a docking station. In one or more embodiments, dock 190 may be utilized to plug-in IHS 110 to one or more peripherals. For example, IHS 110 may be a laptop, a notebook, a telephone (e.g., a smart phone), a tablet, a PDA, etc.

In one or more embodiments, dock 190 may allow, permit, and/or enable a portable IHS 110 (e.g., a laptop, a notebook, a telephone, a tablet, a PDA, etc.) to become a substitute for a desktop computer, without sacrificing mobile computing functionality of portable IHS 110. For example, portable IHS 110 may dock and/or may undock hot, cold, or standby, which may be associated with one or more capabilities of dock 190 and/or portable IHS 110. In one instance, cold docking and/or undocking may require that portable IHS 110 be shutdown for docking and/or undocking. In another instance, hot docking and/or undocking may not require that portable IHS 110 be shutdown for docking and/or undocking. In one or more embodiments, a portable IHS 110 may include one or more structures and/or one or more functionalities described above and may have a form factor of that of or similar to one or more of a laptop, a notebook, a telephone, a tablet, and a PDA, among others. For example, a portable IHS 110 may be readily carried and/or transported by a user (e.g., a person).

In one or more embodiments, dock 190 may be or include one or more port replicators. For example, a port replicator may function as multiple extension connectors and/or cables that are plugged in and/or unplugged together. For instance, a port replicator may include one or more of a USB port, a DVI (Digital Visual Interface) port, a HDMI (High-Definition Multimedia Interface) port, a PCIe port, an Ethernet port, a Display port, a UART (universal asynchronous receiver-transmitter) port, and a Thunderbolt port, among others.

In one or more embodiments, dock 190 may include additional ports. For example, dock 190 may be coupled to IHS 110 via Thunderbolt, USB-C, and/or a wireless coupling (e.g., WiGig, wireless USB, ultra wideband, etc.). In one instance, dock 190 may provide one or more of USB port, a DVI port, a HDMI port, a PCIe port, an Ethernet port, a Display port, a UART port, and a Thunderbolt port, among others. In a second instance, dock 190 and IHS 110 may communicate information to and/or from ports provided by dock 190 via Thunderbolt, USB-C, and/or a wireless coupling, among others. In another instance, dock 190 and IHS 110 may communicate information to and/or from ports provided by dock 190 via multiplexing the information to and/or from ports provided by dock 190 over and/or through Thunderbolt, USB-C, and/or a wireless coupling, among others.

Figure 2A:
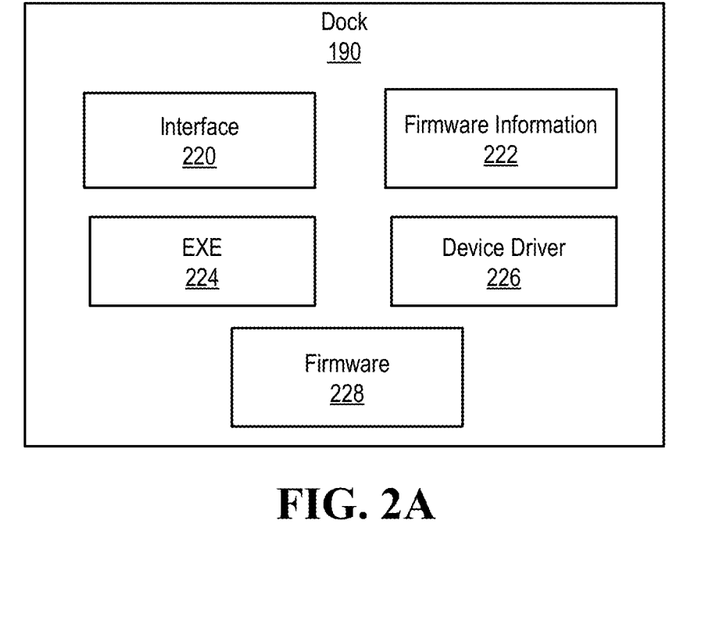
FIG. 2A illustrates an example of a dock device, according to one or more embodiments.

Turning now to FIG. 2A, an example of a dock device is illustrated, according to one or more embodiments. As shown, dock 190 may include an interface 220. In one or more embodiments, dock 190 may utilize interface 220 in communicating with IHS 110. In one example, interface 220 may be or include a USB interface. For instance, interface 220 may be or include a USB-C interface. In a second example, interface 220 may be or include a PCIe interface. In a third example, interface 220 may be or include a Thunderbolt interface. In another example, interface 220 may be or include a wireless interface. For instance the wireless interface may include one or more of a WiGig interface, wireless USB interface, and an ultra wideband interface, among others.

As illustrated, dock 190 may include firmware information 222. In one or more embodiments, firmware information 222 may include one or more of a name, identification information, and firmware version information, among others. As shown, dock 190 may include an executable (EXE) 224. In one or more embodiments, EXE 224 may include instructions executable by a processor. For example, EXE 224 may include instructions executable by processor 120. In one or more embodiments, EXE 224 may include one or more of compiled instructions, a script, and data, among others.

As illustrated, dock 190 may include a device driver 226. In one or more embodiments, device driver 226 may include instructions executable by a processor. For example, device driver 226 may include instructions executable by processor 120 that enable and/or permit one or more of OS 162 and IHSFW 172 to communicate with dock 190. For instance, device driver 226 may provide a software interface, a firmware interface, and/or OS interface to one or more hardware devices, enabling software (e.g., APP 164), firmware (e.g., IHSFW 172), OS 162 to access hardware functionality and/or data of dock 190.

In one or more embodiments, a device driver (e.g., device driver 226) may communicate with the one or more devices via a communications bus and/or a communications subsystem to which the one or more devices may be communicatively coupled. For example, a calling subroutine (e.g., instructions executable via a processor) invokes and/or instantiates a routine in the device driver, the device driver may issue and/or provide one or more commands and/or instructions to the one or more devices. For instance, the device driver, based on the one or more commands and/or instructions, may invoke and/or instantiate functionality of the one or more device and/or retrieve information from the one or more devices. In one or more embodiments, the device driver may provide interrupt handling asynchronous and/or time-dependent to one or more hardware interfaces and/or one or more devices. For example, in response to an interrupt, the device driver may automatically retrieve data from one or more devices and provide the data from the one or more devices to an OS. For instance, the device driver may provide the data from the one or more devices to one or more queues of the OS. In one or more embodiments, an OS may load a device driver. For example, the device driver may not be included in the OS when the OS is compiled but loaded after at least a portion of the OS is executed via a processor (e.g., processor 120). For instance, the device driver may be, include, or be included in a kernel loadable module.

As illustrated, dock 190 may include firmware 228. For example, firmware 228 may include instructions that may be executed by dock 190. For instance, firmware 228 may include instructions that may be executed by a processor (not specifically illustrated) of dock 190. In one or more embodiments, firmware 228 may include firmware information 222.

In one or more embodiments, IHS 110 may access and/or retrieve one or more of firmware information 222, EXE 224, and device driver 226, among others. For example, one or more of firmware information 222, EXE 224, and device driver 226 may be accessed and/or retrieved via interface 220. For instance, one or more of firmware information 222, EXE 224, and device driver 226 may be accessed and/or retrieved via PCIe configuration memory of dock 190. In one or more embodiments, one or more portions of one or more of firmware information 222, EXE 224, and device driver 226 may be accessed and/or retrieved. For example, one or more portions of firmware information 222 may be accessed and/or retrieved. For instance, one or more of the name, the identification information, and the firmware version information of firmware information, among others, may be accessed and/or retrieved. In one or more embodiments, dock 190 may store one or more of firmware information 222, EXE 224, and device driver 226, among others, via a memory medium (not specifically illustrated) of dock 190. For example, the one or more memory media of dock 190 may include one or more structures and/or one or more functionalities of those described with reference to memory media 150 and 160.

Figure 2B:
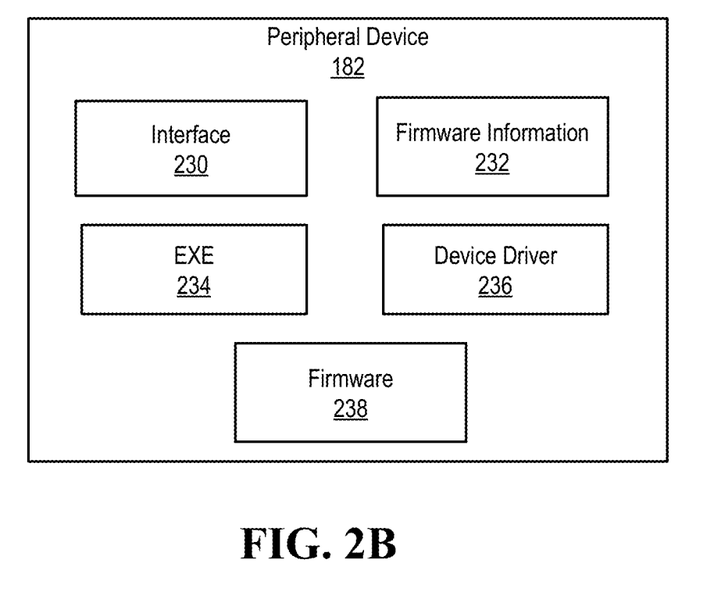
FIG. 2B illustrates an example of a peripheral device is illustrated, according to one or more embodiments.

Turning now to FIG. 2B, an example of a peripheral device is illustrated, according to one or more embodiments. As shown, peripheral device 182 may include an interface 230. In one or more embodiments, peripheral device 182 may utilize interface 230 in communicating with IHS 110 or dock 190. In one example, interface 230 may be or include a USB interface. For instance, interface 230 may be or include a USB-C interface. In a second example, interface 230 may be or include a PCIe interface. In a third example, interface 230 may be or include a Thunderbolt interface. In another example, interface 230 may be or include a wireless interface. For instance the wireless interface may include one or more of a WiGig interface, a Bluetooth interface, wireless USB interface, and an ultra wideband interface, among others.

As illustrated, peripheral device 182 may include firmware information 232. In one or more embodiments, firmware information 232 may include one or more of a name, identification information, and firmware version information, among others. As shown, peripheral device 182 may include an EXE 234. In one or more embodiments, EXE 234 may include instructions executable by a processor. For example, EXE 234 may include instructions executable by processor 120. In one or more embodiments, EXE 234 may include one or more of compiled instructions, a script, and data, among others.

As illustrated, peripheral device 182 may include a device driver 236. In one or more embodiments, device driver 236 may include instructions executable by a processor. For example, device driver 236 may include instructions executable by processor 120 that enable and/or permit one or more of OS 162 and IHSFW 172 to communicate with peripheral device 182. For instance, device driver 236 may provide a software interface, a firmware interface, and/or OS interface to one or more hardware devices, enabling software (e.g., APP 164), firmware (e.g., IHSFW 172), OS 162 to access hardware functionality of peripheral device 182.

In one or more embodiments, a device driver (e.g., device driver 236) may communicate with the one or more devices via a communications bus and/or a communications subsystem to which the one or more devices may be communicatively coupled. For example, a calling subroutine (e.g., instructions executable via a processor) invokes and/or instantiates a routine in the device driver, the device driver may issue and/or provide one or more commands and/or instructions to the one or more devices. For instance, the device driver, based on the one or more commands and/or instructions, may invoke and/or instantiate functionality of the one or more device and/or retrieve information from the one or more devices. In one or more embodiments, the device driver may provide interrupt handling asynchronous and/or time-dependent to one or more hardware interfaces and/or one or more devices. For example, in response to an interrupt, the device driver may automatically retrieve data from one or more devices and provide the data from the one or more devices to an OS. For instance, the device driver may provide the data from the one or more devices to one or more queues of the OS. In one or more embodiments, an OS may load a device driver. For example, the device driver may not be included in the OS when the OS is compiled but loaded after at least a portion of the OS is executed via a processor (e.g., processor 120). For instance, the device driver may be, include, or be included in a kernel loadable module.

As illustrated, peripheral device 182 may include firmware 238. For example, firmware 238 may include instructions that may be executed by peripheral device 182. For instance, firmware 238 may include instructions that may be executed by a processor (not specifically illustrated) of peripheral device 182. In one or more embodiments, firmware 238 may include firmware information 232.

In one or more embodiments, IHS 110 may access and/or retrieve one or more of firmware information 232, EXE 234, and device driver 236, among others. For example, one or more of firmware information 232, EXE 234, and device driver 236 may be accessed and/or retrieved via interface 230. For instance, one or more of firmware information 232, EXE 234, and device driver 236 may be accessed and/or retrieved via PCIe configuration memory of peripheral device 182. In one or more embodiments, one or more portions of one or more of firmware information 232, EXE 234, and device driver 236 may be accessed and/or retrieved. For example, one or more portions of firmware information 232 may be accessed and/or retrieved. For instance, one or more of the name, the identification information, and the firmware version information of firmware information, among others, may be accessed and/or retrieved. In one or more embodiments, peripheral device 182 may store one or more of firmware information 232, EXE 234, and device driver 236, among others, via a memory (not specifically illustrated) of peripheral device 182.

Figure 3A:
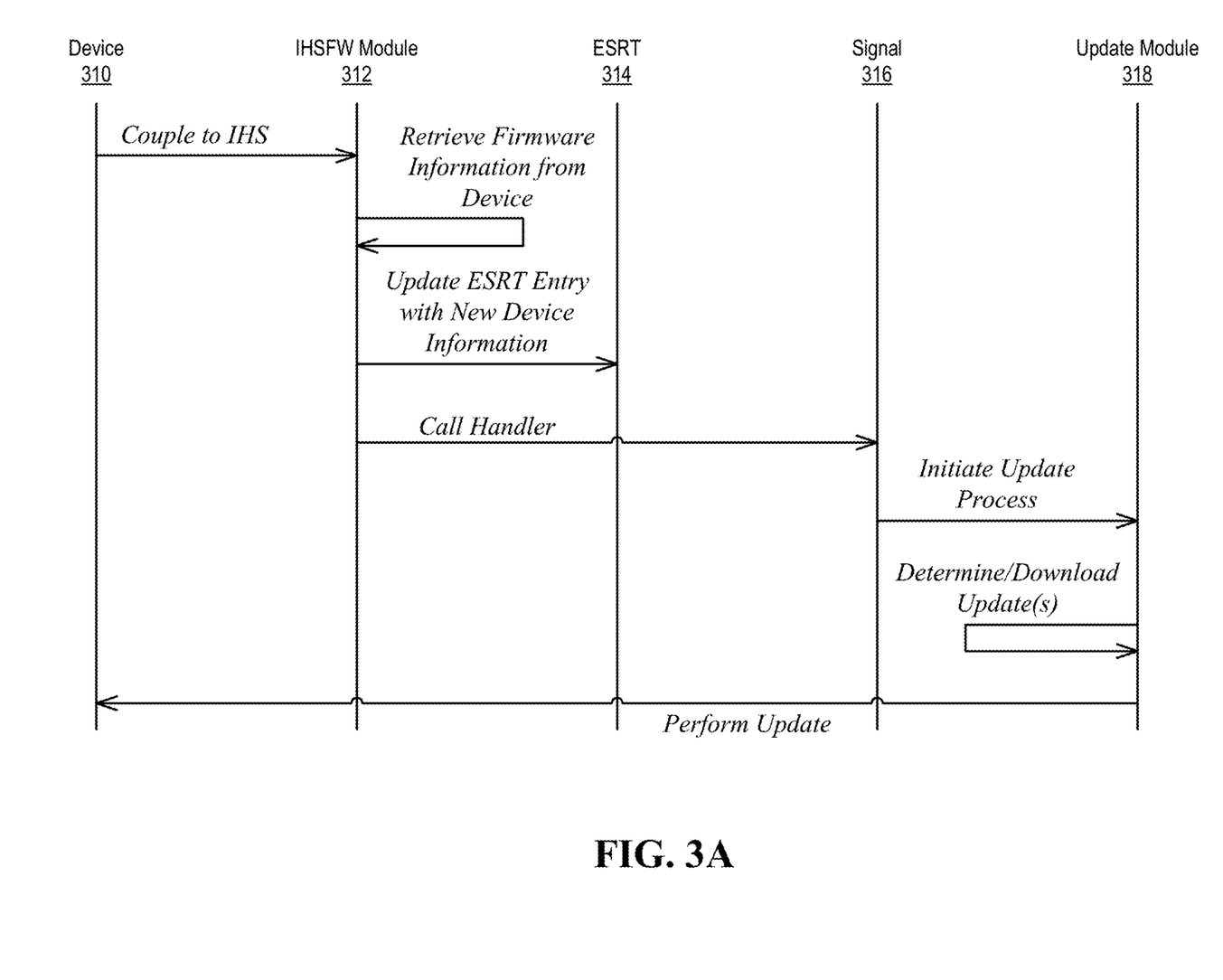
FIG. 3A illustrates an example sequence diagram, according to one or more embodiments.

Turning now to FIG. 3A, an example sequence diagram is illustrated, according to one or more embodiments. As shown, a device 310 may couple to an IHS (e.g., IHS 110). In one example, device 310 may be or include dock 190. In another example, device 310 may be or include peripheral device 182. As illustrated, an IHSFW module 312 may retrieve firmware information from device 310.

In one example, IHSFW module 312 may retrieve firmware information 222 from dock 190. For instance, in retrieving firmware information 222 from dock 190, IHSFW module 312 may retrieve one or more portions of firmware information 222 from dock 190. In another example, IHSFW module 312 may retrieve firmware information 222 from peripheral device 182. For instance, in retrieving firmware information 232 from peripheral device 182, IHSFW module 312 may retrieve one or more portions of firmware information 232 from peripheral device 182. In one or more embodiments, IHSFW module 312 may be or include an ACPI module.

As shown, IHSFW module 312 may update an ESRT 314 with new device information. In one example, IHSFW module 312 may update ESRT 314 with new device information associated with one or more portions of firmware information 222 from dock 190. In another example, IHSFW module 312 may update ESRT 314 with new device information associated with one or more portions of firmware information 232 from peripheral device 182. In one or more embodiments, ESRT 314 may be or include an UEFI ESRT. As illustrated, a handler may be called. For example, IHSFW module 312 may call the handler. For instance, ASL code of IHSFW module 312 may call the handler. In one or more embodiments, the handler may be or include an update handler. For example, the update handler may be or include a DCU ("Dell Command I Update") executable. As shown, a signal 316 may initiate an update processes. In one or more embodiments, signal 316 may be or include a signal to an OS (e.g., OS 162).

As illustrated, an update module 318 may determine and/or download one or more updates. In one or more embodiments, update module 318 may be or include the DCU executable. In one example, the DCU executable may determine from the new device information that one or more updates may be performed. In another example, the DCU executable may download the one or more updates. For instance, the one or more updates may be downloaded via a network. As shown, update module 318 may perform an update of device 310.

Figure 3B:
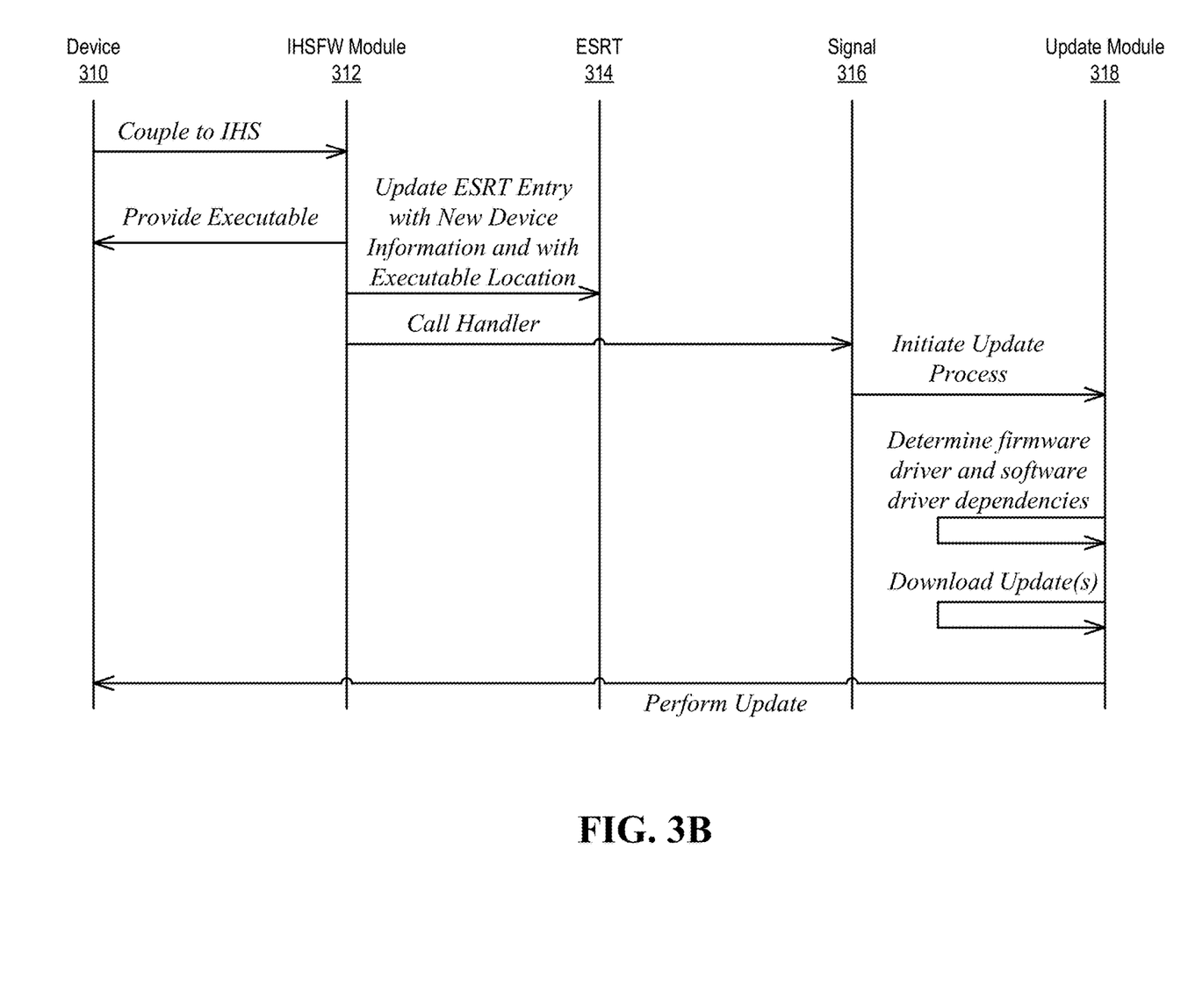
FIG. 3B illustrates another example sequence diagram, according to one or more embodiments.

Turning now to FIG. 3B, another example sequence diagram is illustrated, according to one or more embodiments. As shown, device 310 may couple to an IHS (e.g., IHS 110). In one example, device 310 may be or include dock 190. In another example, device 310 may be or include peripheral device 182. As illustrated, IHSFW module 312 may provide an executable to device 310. As shown, IHSFW module 312 may update an ESRT entry of ESRT 314 with new device information and with a location of the executable provided to device 310.

As illustrated, a handler may be called from IHSFW module 312. For example, the handler may be called from ASL code. In one or more embodiments, the handler may be or include an update handler. For example, the update handler may be or include a DCU executable. As shown, signal 316 may initiate an update processes.

As illustrated, firmware driver and software driver dependencies may be determined. In one example, a firmware driver may include firmware for dock 190. In a second example, a firmware driver may include firmware for peripheral device 182. In a third example, a software driver may include a device driver associated with dock 190. In another example, a software driver may include a device driver associated with peripheral device 182. As shown, update module 318 may download one or more updates. In one or more embodiments, update module 318 may be or include the DCU executable. For example, the DCU executable may download the one or more updates. For instance, the one or more updates may be downloaded via a network. As illustrated, update module 318 may perform an update of device 310.

Figure 4:
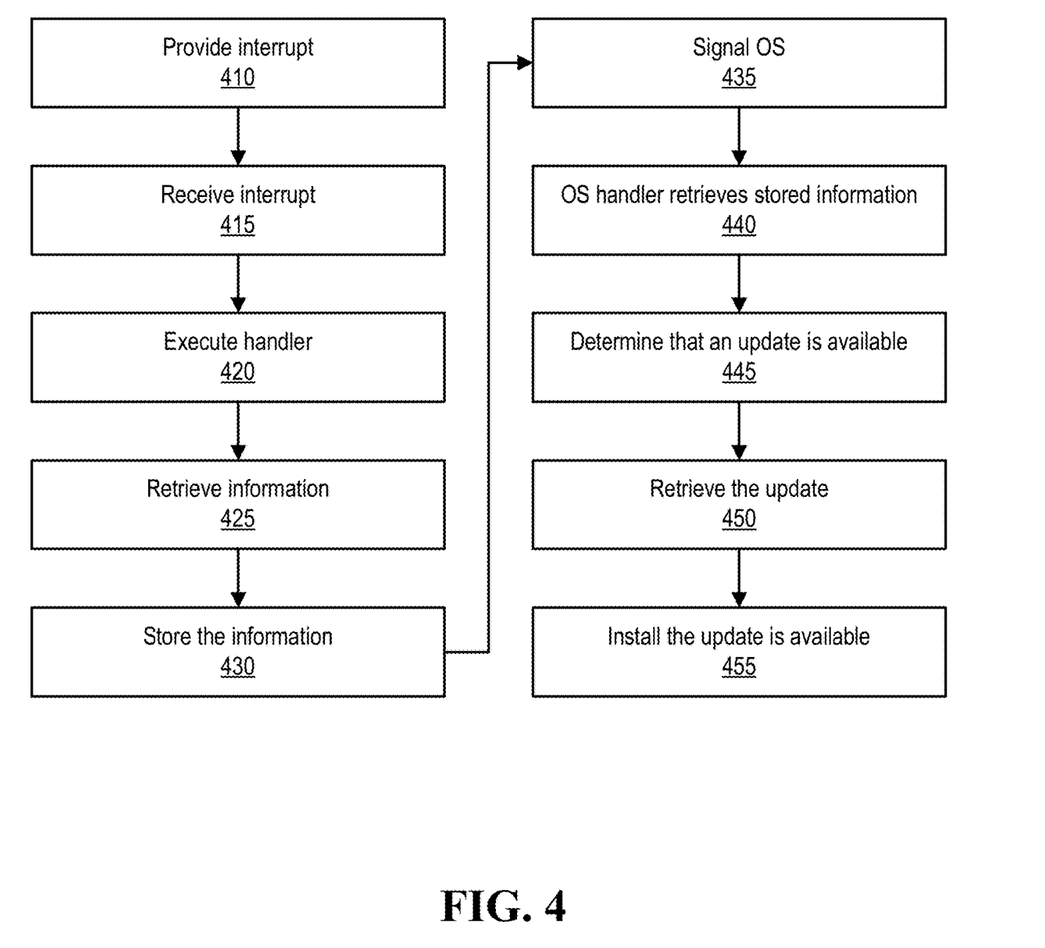
FIG. 4 illustrates an example of a method of operating a system, according to one or more embodiments.

Turning now to FIG. 4, an example of a method of operating a system is illustrated, according to one or more embodiments. At 410, an interrupt may be provided. In one example, peripheral device 182 may provide an interrupt to IHS 110. For instance, the interrupt may be or include an ACPI interrupt. In another example, dock 190 may provide an interrupt to IHS 110. For instance, the interrupt may be or include an ACPI interrupt.

At 415, the interrupt may be received. For example, IHS 110 may receive the interrupt. For instance, IHSFW 172 of IHS 110 may receive the interrupt. At 420, a handler may be executed. For example, the handler may be an interrupt handler. For instance, the interrupt may include identification, and the handler may be executed based at least on the identification. In one or more embodiments, the handler may be or include ASL code. For example, the ASL code may be compiled into instructions that are executable by a processor (e.g., processor 120). In one instance, IHSFW 172 may store the ASL code. In another instance, IHSFW 172 may call the ASL code.

At 425, information may be retrieved. In one example, the handler may retrieve information from peripheral device 182. For instance, the handler may retrieve one or more portions of firmware information 232 from peripheral device 182. In another example, the handler may retrieve information from dock 190. For instance, the handler may retrieve one or more portions of firmware information 222 from dock 190.

At 430, the information may be stored. For example, the handler may store the information via one or more of volatile memory medium 150 and non-volatile memory medium 160, among others. For instance, the handler may store the information via a data structure that may be stored via one or more of volatile memory medium 150 and non-volatile memory medium 160, among others. In one or more embodiments, the data structure may be or include an ESRT. For example, the ESRT may be or include an UEFI ESRT. In one or more embodiments, the information may be stored after an OS has booted. For example, the information may be stored after OS 162 has booted. For instance, storing the information stored after the OS has booted may include modifying the ESRT after the OS has booted.

At 435, an OS may be signaled. For example, the handler may signal the OS (e.g., OS 162). In one or more embodiments, OS 162 may include a management information exchange. In one example, the management information exchange may permit multiple components to exchange management information associated with managed elements and/or may permit control and/or management of the managed elements. In another example, the management information exchange may include a driver and/or a driver model that may provide an OS interface through which managed elements (e.g., elements of IHS 110) may provide information and/or notifications, among others. In one instance, the management information exchange may be or include a Windows Management Interface (WMI) for ACPI (available from Microsoft Corporation). In another instance, the management information exchange may be or include a Common Information Model (CIM) (available via the Distributed Management Task Force). In one or more embodiments, the handler may notify OS 162, via the management information exchange, that information associated with a device coupled to IHS 110 is available. For example, after OS 162 receives a notification from the handler, OS 162 may execute processor instructions (e.g., an APP of APPs 164-168). For instance, OS 162 may execute the DCU.

At 440, an OS handler may retrieve stored information. For example, the OS handler may be or include an APP of APPs 164-168 and/or the DCU. For instance, the OS handler may retrieve the information stored via method element 430. At 445, the OS handler may determine that an update is available. In one example, the OS handler may determine that a firmware update is available for peripheral device 182. In another example, the OS handler may determine that a firmware update is available for dock 190.

At 450, the update may be retrieved. For example, the OS handler may retrieve the update. For instance, retrieving the update may include downloading the update from a network. In one or more embodiments, the update may include updated and/or new firmware. In one example, the updated and/or new firmware may include updated and/or new firmware for peripheral device 182. In another example, the updated and/or new firmware may include updated and/or new firmware for dock 190. At 455, the update may be installed. For example, the OS handler may install the update. In one instance, the OS handler may install the update to peripheral device 182. In another instance, the OS handler may install the update to dock 190.

Figure 5:
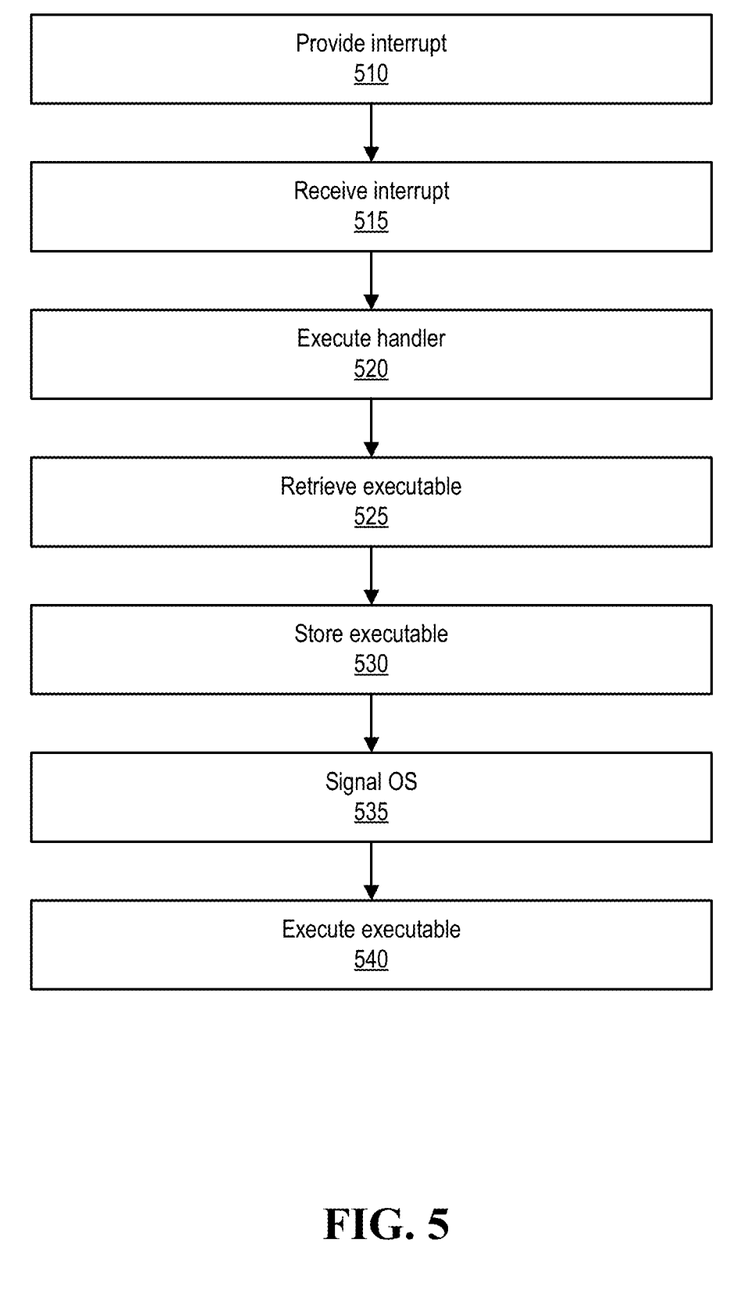
FIG. 5 illustrates another example of a method of operating a system, according to one or more embodiments.

Turning now to FIG. 5, another example of a method of operating a system is illustrated, according to one or more embodiments. At 510, an interrupt may be provided. In one example, peripheral device 182 may provide an interrupt to IHS 110. For instance, the interrupt may be or include an ACPI interrupt. In another example, dock 190 may provide an interrupt to IHS 110. For instance, the interrupt may be or include an ACPI interrupt.

At 515, the interrupt may be received. For example, IHS 110 may receive the interrupt. For instance, IHSFW 172 of IHS 110 may receive the interrupt. At 520, a handler may be executed. For example, the handler may be an interrupt handler. For instance, the interrupt may include identification, and the handler may be executed based at least on the identification. In one or more embodiments, the handler may be or include ASL code. For example, the ASL code may be compiled into instructions that are executable by a processor (e.g., processor 120). In one instance, IHSFW 172 may store the ASL code. In another instance, IHSFW 172 may call the ASL code.

At 525, an executable may be retrieved. For example, the handler may retrieve the executable. In one instance, EXE 234 may be retrieved from peripheral device 182. In another instance, EXE 224 may be retrieved from dock 190. In one or more embodiments, the executable may include instructions executable by a processor (e.g., processor 120). At 530, the executable may be stored. For example, the executable may be stored via one or more of volatile memory medium 150 and non-volatile memory medium 160, among others.

At 535, an OS may be signaled. For example, the handler may signal the OS (e.g., OS 162). In one or more embodiments, OS 162 may include a management information exchange. In one example, the management information exchange may permit multiple components to exchange management information associated with managed elements and/or may permit control and/or management of the managed elements. In another example, the management information exchange may include a driver and/or a driver model that may provide an OS interface through which managed elements (e.g., elements of IHS 110) may provide information and/or notifications, among others. In one instance, the management information exchange may be or include a WMI for ACPI. In another instance, the management information exchange may be or include a CIM. In one or more embodiments, the handler may notify OS 162, via the management information exchange, that the executable is available via one or more of volatile memory medium 150 and non-volatile memory medium 160, among others.

At 540, the executable may be executed. For example, processor 120 may execute the executable. In one or more embodiments, the executable may include and/or performed one or more functionalities as those described with the OS handler. For example, the executable may perform one or more of determining that an update is available (e.g., a firmware update for peripheral device 182 or dock 190), retrieving the update (e.g., retrieving a firmware update for peripheral device 182 or dock 190), and installing the update (e.g., installing a firmware update and/or new firmware to peripheral device 182 or dock 190), among others. In one or more embodiments, the executable may retrieve a device driver. In one example, the executable may retrieve a device driver for peripheral device 182. For instance, retrieving the device driver for peripheral device 182 may include downloading the device driver via a network. In another example, the executable may retrieve a device driver for dock 190. For instance, retrieving the device driver for dock 190 may include downloading the device driver via a network.

Figure 6:
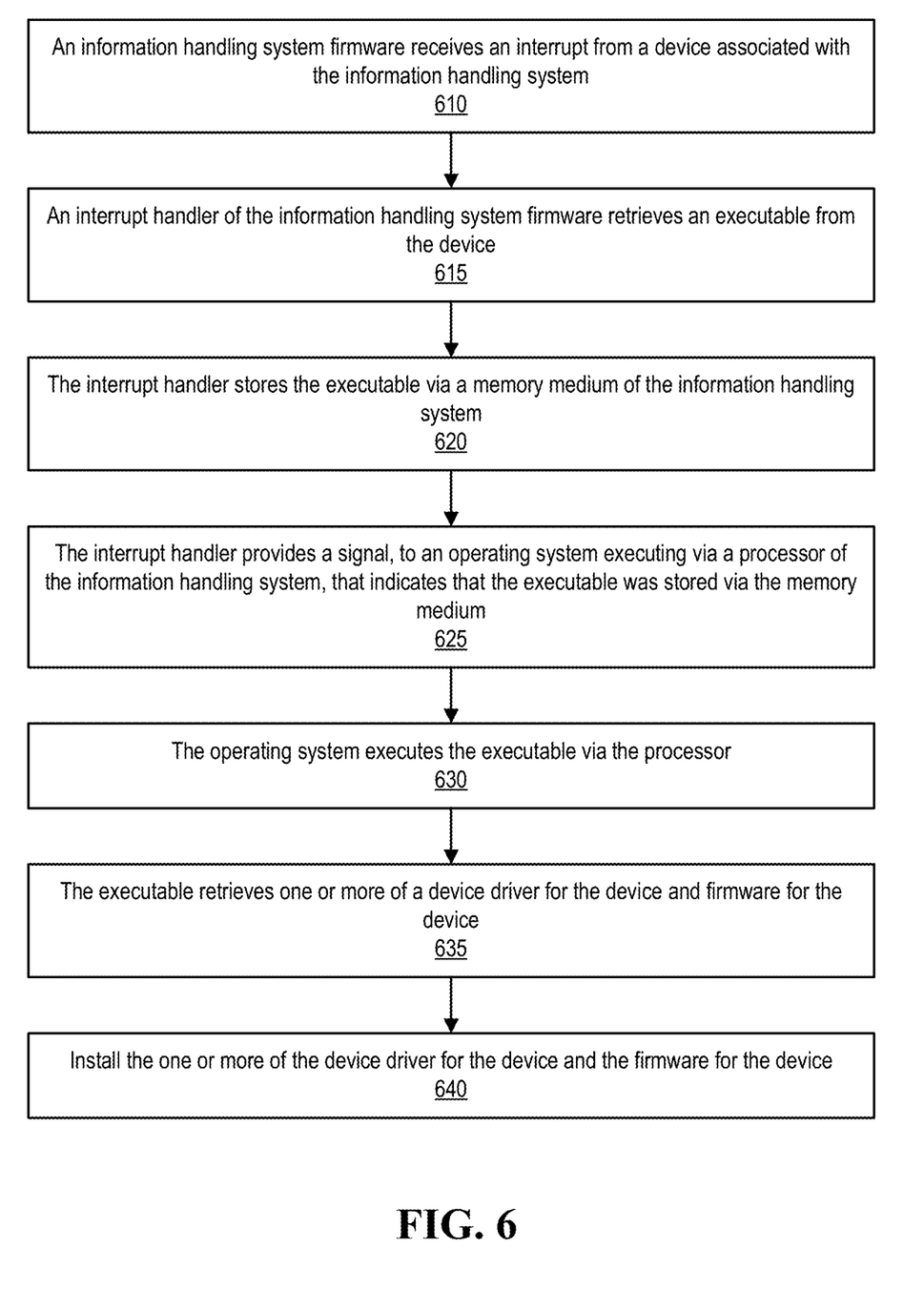
FIG. 6 illustrates an example of a method of operating an information handling system, according to one or more embodiments.

Turning now to FIG. 6, an example of a method of operating an information handling system is illustrated, according to one or more embodiments. At 610, an information handling system firmware may receive an interrupt from a device associated with the information handling system. For example, IHSFW 172 may receive an interrupt from a device (e.g., peripheral device 182, dock 190, etc.). For instance, the interrupt may be or include an ACPI interrupt.

At 615, an interrupt handler of the information handling system firmware may retrieve an executable from the device. In one example, an interrupt handler of IHSFW 172 may retrieve EXE 222 from dock 190. In another example, an interrupt handler of IHSFW 172 may retrieve EXE 232 from peripheral device 182. In one or more embodiments, the interrupt handler may be or include ASL code. For example, the ASL code may be or include compiled instructions that may execute via processor 120. At 620, the interrupt handler may store the executable via a memory medium of the information handling system. In one example, the interrupt handler may store the executable via volatile memory medium 150. In another example, the interrupt handler may store the executable via non-volatile memory medium 160.

At 625, the interrupt handler may provide a signal, to an operating system executing via a processor of the information handling system, that indicates that the executable was stored via the memory medium. For example, the interrupt handler may provide the signal, to OS 162 executing via processor 120, the indicates that the executable was stored via the memory medium. In one or more embodiments, the operating system may receive the signal via at least one of a WMI and a CIM, among others.

At 630, the operating system may execute the executable via the processor. In one or more embodiments, the operating system may executing the executable via the processor may include the operating system storing and/or placing at least a portion of the executable in a memory medium and providing a memory address of the at least the portion of the executable to the processor. In one example, providing the memory address of the at least the portion of the executable to the processor may include utilizing a jump instruction and/or a branch instruction to a memory address associated with the at least the portion of the executable. In another example, providing the memory address of the at least the portion of the executable to the processor may include utilizing a jump to subroutine instruction and/or a branch and link instruction to a memory address associated with the at least the portion of the executable.

At 635, the executable may retrieve one or more of a device driver for the device and firmware for the device. In one example, the executable may retrieve the one or more of the device driver for the device and the firmware for the device from the device. In another example, the executable may retrieve the one or more of the device driver for the device and the firmware for the device via a network. For instance, the executable may retrieve the one or more of the device driver for the device and the firmware for the device from another information handling system via the network. At 640, the one or more of the device driver for the device and the firmware for the device may be installed. In one example, the executable may install the one or more of the device driver for the device and the firmware for the device. In another example, the operating system may install the one or more of the device driver for the device and the firmware for the device. In one or more embodiments, the device driver may be installed, and after the device driver is installed, the operating system may communicate with the device via the device driver.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, systems, methods, and/or processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   at least one processor; and
   a memory medium that is coupled to the at least one processor and that includes instructions executed by the at least one processor causing the information handling system to:
      receive an Advanced Configuration and Power Interface (ACPI) interrupt from a docking station coupled to the information handling system and to one or more peripheral devices, the docking station including an interface to allow communication between the information handling system and the one or more peripheral devices;
      retrieve an executable from the docking station via the interface;
      after retrieving the executable from the docking station, store the executable via the memory medium;
      provide a signal, to an operating system executing via the at least one processor, that indicates that the executable was stored via the memory medium, the signal provided via at least one of a Windows Management Interface (WMI) and a Common Information Model (CIM);
      execute the executable via the operating system and the at least one processor;
      retrieve, by the executable and from the docking station, a device driver for the docking station and firmware for the docking station; and
      install the device driver for the docking station and the firmware for the docking station.

2. The information handling system of claim 1, wherein the docking station includes a peripheral device.

3. The information handling system of claim 1,
   wherein, to install the device driver for the docking station and the firmware for the docking station, the instructions further cause the information handling system to:
      install the device driver; and
   wherein the instructions further cause the information handling system to:
      communicate with the docking station via the device driver, after installing the device driver.

4. The information handling system of claim 1, wherein, the device driver for the docking station and the firmware for the docking station, the instructions further cause the information handling system to:
   retrieve the device driver from the docking station.

5. A method of operating an information handling system, comprising:
   information handling system firmware receiving an Advanced Configuration and Power Interface (ACPI) interrupt from a docking station coupled to the information handling system and to one or more peripheral devices, the docking station including an interface to allow communication between the information handling system and the one or more peripheral devices;

an interrupt handler of the information handling system firmware retrieving an executable from the docking station via the interface;

after the interrupt handler of the information handling system firmware retrieving the executable from the docking station, the interrupt handler storing the executable via a memory medium of the information handling system;

the interrupt handler providing a signal, to an operating system executing via a processor of the information handling system, that indicates that the executable was stored via the memory medium, the signal provided via at least one of a Windows Management Interface (WMI) and a Common Information Model (CIM);

the operating system executing the executable via the processor;

the executable retrieving, from the docking station, a device driver for the docking station and firmware for the docking station; and the executable installing the device driver for the docking station and the firmware for the docking station.

6. The method of claim 5, wherein the docking station includes a peripheral device.

7. The method of claim 5, wherein the installing the device driver for the docking station and the firmware for the docking station includes installing the device driver;

the method further comprising:
after the installing the device driver, the operating system communicating with the docking station via the device driver.

8. The method of claim 5, wherein the executable retrieving the device driver for the docking station and the firmware for the docking station includes the executable retrieving the device driver from the docking station.

9. A computer-readable non-transitory memory medium that includes instructions executed by at least one processor of an information handling system causing the information handling system to:

receive an Advanced Configuration and Power Interface (ACPI) interrupt from a docking station coupled to the information handling system and to one or more peripheral devices, the docking station including an interface to allow communication between the information handling system and the one or more peripheral devices;

retrieve an executable from the docking station via the interface;

after retrieving the executable from the docking station, store the executable via the memory medium;

provide a signal, to an operating system executing via the at least one processor, that indicates that the executable was stored via the memory medium, the signal provided via at least one of a Windows Management Interface (WMI) and a Common Information Model (CIM);

execute the executable via the operating system and the at least one processor;

retrieve, by the executable and from the docking station, a device driver for the docking station and firmware for the docking station; and install the device driver for the docking station and the firmware for the docking station.

10. The computer-readable non-transitory memory medium of claim 9, wherein, to install the device driver for the docking station and the firmware for the docking station, the instructions further cause the information handling system to:
install the device driver; and wherein the instructions further cause the information handling system to:
communicate with the docking station via the device driver, after installing the device driver.

11. The computer-readable non-transitory memory medium of claim 9, wherein, to retrieve the device driver for the docking station and the firmware for the docking station, the instructions further cause the information handling system to:

retrieve the device driver from the docking station.

* * * * *